(12) United States Patent
Nicol et al.

(10) Patent No.: US 9,111,303 B2
(45) Date of Patent: Aug. 18, 2015

(54) BEVERAGE DISPENSING SYSTEMS AND METHODS

(75) Inventors: James Nicol, Tualatin, OR (US); Gorham Nicol, Tualatin, OR (US)

(73) Assignee: BEVERAGE MANAGEMENT SYSTEMS, INC., Tualatin, OR (US)

( * ) Notice: Subject to any disclaimer, the term of this patent is extended or adjusted under 35 U.S.C. 154(b) by 114 days.

(21) Appl. No.: 13/370,258

(22) Filed: Feb. 9, 2012

(65) Prior Publication Data

US 2013/0085599 A1   Apr. 4, 2013

Related U.S. Application Data

(60) Provisional application No. 61/542,701, filed on Oct. 3, 2011.

(51) Int. Cl.
| | |
|---|---|
| G06F 17/00 | (2006.01) |
| G06Q 30/00 | (2012.01) |
| B67D 3/00 | (2006.01) |
| G06Q 30/06 | (2012.01) |

(52) U.S. Cl.
CPC ........ *G06Q 30/06* (2013.01); *B67D 3/00* (2013.01); *G06F 17/00* (2013.01)

(58) Field of Classification Search
CPC ........................................................ B67D 3/00
USPC ................................................. 700/238–240
See application file for complete search history.

(56) References Cited

U.S. PATENT DOCUMENTS

| | | | |
|---|---|---|---|
| 3,336,957 A | | 8/1967 | Goosman |
| 3,940,019 A | | 2/1976 | Kross et al. |
| 3,991,911 A | | 11/1976 | Shannon et al. |
| 4,252,253 A | * | 2/1981 | Shannon ........................ 222/25 |
| 4,276,999 A | * | 7/1981 | Reichenberger ........... 222/129.4 |
| RE32,142 E | * | 5/1986 | Meyers ............................. 141/4 |
| 5,603,430 A | * | 2/1997 | Loehrke et al. .................... 222/1 |
| 8,190,483 B2 | * | 5/2012 | Woycik et al. ............... 705/26.1 |
| 8,201,736 B2 | * | 6/2012 | Doglioni Majer ........... 235/383 |
| 8,433,440 B2 | * | 4/2013 | Felique et al. ................ 700/232 |
| 8,442,674 B2 | * | 5/2013 | Tilton et al. .................. 700/233 |
| 8,459,043 B2 | * | 6/2013 | Bertone .............................. 62/1 |
| 8,584,900 B2 | * | 11/2013 | Metropulos et al. ........ 222/129.1 |
| 8,676,376 B2 | * | 3/2014 | Quartarone et al. .......... 700/231 |
| 2008/0093381 A1 | * | 4/2008 | Smith et al. ................... 222/129 |
| 2009/0293733 A1 | * | 12/2009 | Martin et al. ................... 99/280 |
| 2010/0145522 A1 | * | 6/2010 | Claesson et al. ............. 700/265 |
| 2010/0198400 A1 | * | 8/2010 | Pascal et al. .................. 700/232 |
| 2010/0242497 A1 | * | 9/2010 | Bertone .............................. 62/1 |
| 2010/0294797 A1 | * | 11/2010 | Hirschbain ....................... 222/1 |

(Continued)

*Primary Examiner* — Michael K Collins

(74) *Attorney, Agent, or Firm* — Marger Johnson & McCollom P.C.

(57) ABSTRACT

A beverage dispensing system includes a point of sale and one or more free-pour and/or controlled-pour spouts. The system receives data at the point of sale that includes a beverage selection entered at a user interface and determines the ingredients in the beverage selection. A dispensing instruction is sent to one of the controlled-pour spouts to dispense a quantity of the ingredient based at least in part on the beverage selection. For the free-pour spouts, a quantity of the ingredient is measured as the ingredient is dispensed from a container through a free-pour spout. The point of sale receives data that includes the identity of the ingredient and the measured quantity. A price of the beverage selection is calculated based at least in part on the ingredients dispensed and the quantities thereof. The price may be automatically calculated upon dispensing of the beverage selection.

19 Claims, 6 Drawing Sheets

(56) References Cited

U.S. PATENT DOCUMENTS

| | | | |
|---|---|---|---|
| 2010/0318225 A1* | 12/2010 | Claesson et al. | 700/265 |
| 2011/0017776 A1* | 1/2011 | Metropulos et al. | 222/129.1 |
| 2011/0121032 A1* | 5/2011 | Deo et al. | 222/145.1 |
| 2011/0166699 A1* | 7/2011 | Palmquist | 700/236 |
| 2012/0035761 A1* | 2/2012 | Tilton et al. | 700/233 |
| 2012/0239187 A1* | 9/2012 | Majer | 700/232 |
| 2013/0087050 A1* | 4/2013 | Studor et al. | 99/285 |
| 2013/0231774 A1* | 9/2013 | Tilton et al. | 700/233 |
| 2014/0117043 A1* | 5/2014 | Ware et al. | 222/95 |

* cited by examiner

BEVERAGE DISPENSING SYSTEMS AND METHODS

CROSS-REFERENCE TO RELATED APPLICATIONS

This application claims the benefit of U.S. Provisional Patent Application No. 61/542,701, filed Oct. 3, 2011, entitled, "Beverage Dispensing Systems and Methods," the contents of which are hereby incorporated by reference. This application is also related to U.S. patent application Ser. No. 13/370,254, entitled, "Beverage Dispensing Systems and Methods," filed on Feb. 9, 2012, the teachings of which are herein incorporated by reference.

BACKGROUND

Beverage dispensing systems aid beverage serving establishments in providing efficient, accurate, beverage service to patrons. At some establishments, patrons order complex beverages that require multiple and sometimes expensive ingredients. Servers and bartenders are supposed to dispense these beverages according to a known recipe or pouring protocol. Following the known recipe or protocol becomes especially important when cocktails or other alcoholic beverages are poured, because liquor and other cocktail ingredients are expensive and owners of establishments serving cocktails and other alcoholic beverages generate high revenue on these beverages. Servers and bartenders make mistakes in dispensing or mixing cocktails, which results in waste and reduces the quality of the dispensed beverage and patron satisfaction. Bartenders oftentimes over-pour (providing free beverages or beverages with greater than the specified amount of alcohol) or under-pour (pouring beverages that do not contain enough alcohol), which further results in inventory loss, decreased revenue, and patron dissatisfaction.

Owners would greatly benefit from beverage dispensing systems and methods that reduce waste, provide accountability for inventory loss, and increase the accuracy of the dispensed beverages for patrons.

SUMMARY

The present description describes examples of beverage dispensing systems and methods, the use of which may help overcome problems and limitations of the prior art.

In an embodiment, a method of dispensing a beverage includes receiving data at a point of sale that includes a beverage selection that is entered at a user interface; determining that ingredients of the beverage selection include at least a first ingredient; sending a first dispensing instruction to a first spout to dispense a first quantity of the first ingredient based at least in part on the beverage selection; and calculating a price of the beverage selection based at least in part on the first quantity of the first ingredient.

In another embodiment, a beverage dispensing system comprises a first dispensing element secured to a first beverage container containing a first ingredient; a first sensor secured to the first dispensing element and configured to dispense the first ingredient; and a processor that is electrically coupled to the first sensor. The processor is configured to receive data from a user interface that includes a beverage selection; calculate a quantity of the at least one ingredient in the beverage selection; generate a dispensing instruction that includes data instructing the first sensor to dispense the first quantity of the first ingredient according the dispensing instruction; and send data including the dispensing instruction to the first sensor. The first sensor is configured to dispense the first ingredient according to the dispensing instruction. The processor is also configured to calculate a price of the beverage selection based at least in part on the first quantity of the first ingredient.

In yet another embodiment, a method of dispensing a beverage comprises determining a beverage selection that includes a first ingredient; measuring a first quantity of the first ingredient dispensed from a first container through a free-pour spout; receiving data at a point of sale that includes the first quantity of the first ingredient; and calculating a price of the beverage selection based at least in part on the first quantity.

In still another embodiment, a beverage dispensing system comprises a first dispensing element secured to a first beverage container containing a first ingredient; a first sensor secured to the first dispensing element; and a processor that is electrically coupled to the first sensor. The processor is configured to receive data from the first sensor that includes a first quantity of the first ingredient that is dispensed from the first dispensing element and calculate a price of a beverage selection that includes the first ingredient. The price is based at least in part on the first quantity of the first ingredient.

In still other embodiments, beverage dispensing systems and methods include a combination of the systems and methods previously described.

DETAILED DESCRIPTION

FIGS. 1-4 illustrate a metered beverage dispensing system 100 that helps provide consistent, measured beverages and is designed to provide user accountability to help in inventory tracking and prevent theft. While any beverages may be dispensed from the beverage dispensing system 100, the examples illustrated in FIGS. 1-4 dispense liquors, cocktails, and other alcoholic beverages. Consistency and accountability become very important when dispensing alcoholic beverages because the ingredients are expensive and are oftentimes difficult to track.

The beverage dispensing system 100 shown in FIGS. 1-4 is designed to operate either in a stand-alone fashion or in conjunction with a beverage dispenser, such as a computerized liquor control system (not shown) and uses either free-pour or controlled-pour spouts or both. The beverage dispensing system 100 keeps track of any number of ingredients such as liquors, cocktails, and other beverages and usage of the system itself, inventory, sales, and any other desired information. When a beverage is poured, the beverage dispensing system may open a new check for a patron or group of patrons or add the beverage's price to an existing check. Such tracking capabilities can be used for sales reporting and to check the accuracy of users of the beverage dispensing system to determine whether the users are over-pouring or under-pouring beverages. For example, all pours, either from a single user or a group of users, may be time-stamped and saved to a memory such as an on-board flash memory that is used to generate reports that keep track of sales, costs, inventory usage, and the like.

Figure 1:
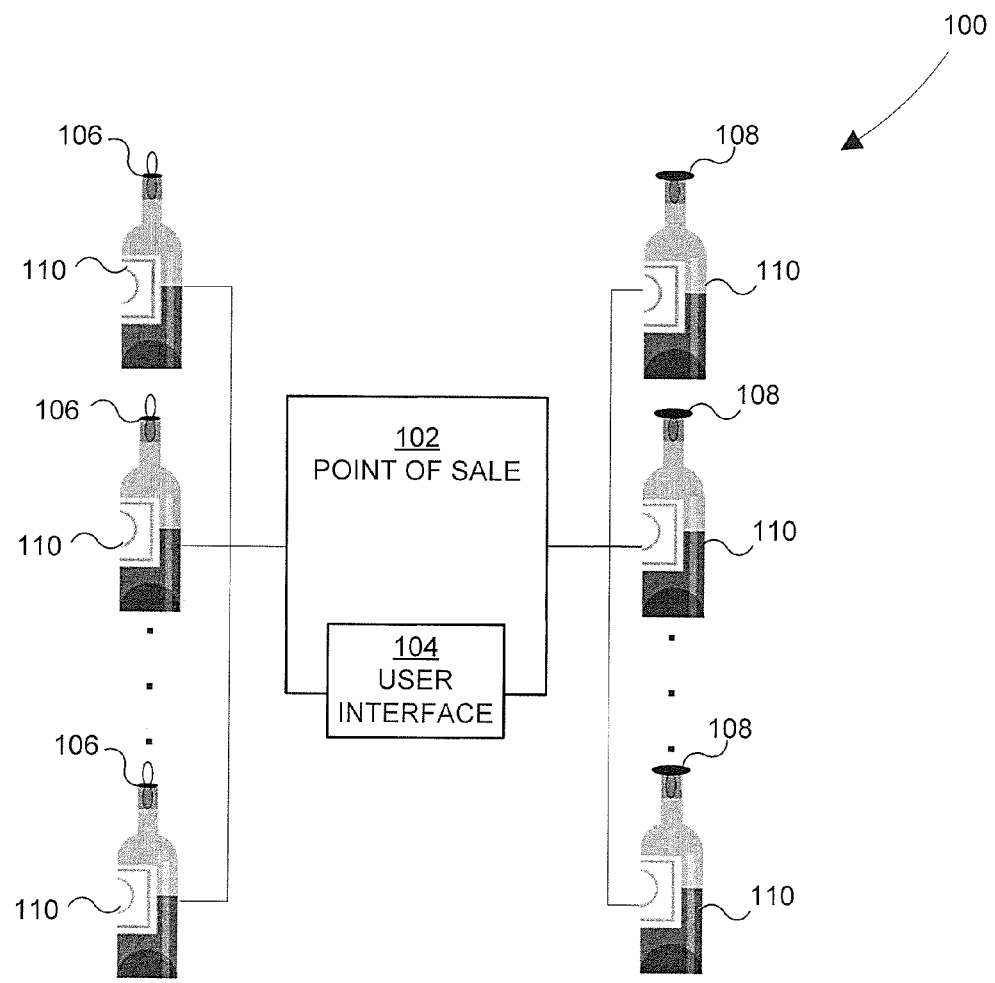
FIG. 1 shows an example beverage dispensing system that includes multiple free-pour and multiple controlled-pour spouts secured to various ingredients for beverages.

FIG. 1 shows an example of the disclosed beverage dispensing system 100 that includes a point of sale 102, a user interface 104, and multiple free-pour 106 and controlled-pour 108 spouts secured to various beverage ingredients 110. The point of sale 102 may be any suitable central computing device. For example, the point of sale 102 may be a central server that is either wirelessly coupled or wired to the user interface 104 and the free-pour 106 and controlled-pour 108 spouts. The free-pour 106 and the controlled-pour spouts may be, for example, metered spouts that are part of the Combopour System available from Easybar.

The user interface 104 may be either integral with the point of sale 102 or remote from the point of sale 102. The user interface 104 prompts the user for data or the user may freely enter data, as desired. The data includes information related to the ordered beverage(s) and may optionally include any other desired information. The user interface 104 is preferably a programmable LCD touch screen with on board image storage, but other platforms such as OLED and non-programmable screens are also options. The user interface 104 also may include voice-activated commands and menus either alone or in combination with the programmable LCD touch screen.

The beverage dispensing system 100 shown in FIG. 1 includes multiple free-pour 106 and multiple controlled-pour 108 spouts. Other examples may have fewer or more of either the free-pour 106 and/or the controlled-pour 108 spouts and may have none of either the free-pour 106 or controlled-pour 108 spouts in some examples. Beverage dispensing systems 100 that only include free-pour spouts 106 may optionally include the user interface 104. However, beverage dispensing systems 100 that include controlled-pour spouts 108 or a combination of free-pour 106 and controlled-pour 106 spouts generally include some type of user interface 104 including, but not limited to a touch-screen computing device, a microphone that receives audio instructions, and the like.

Figure 2:
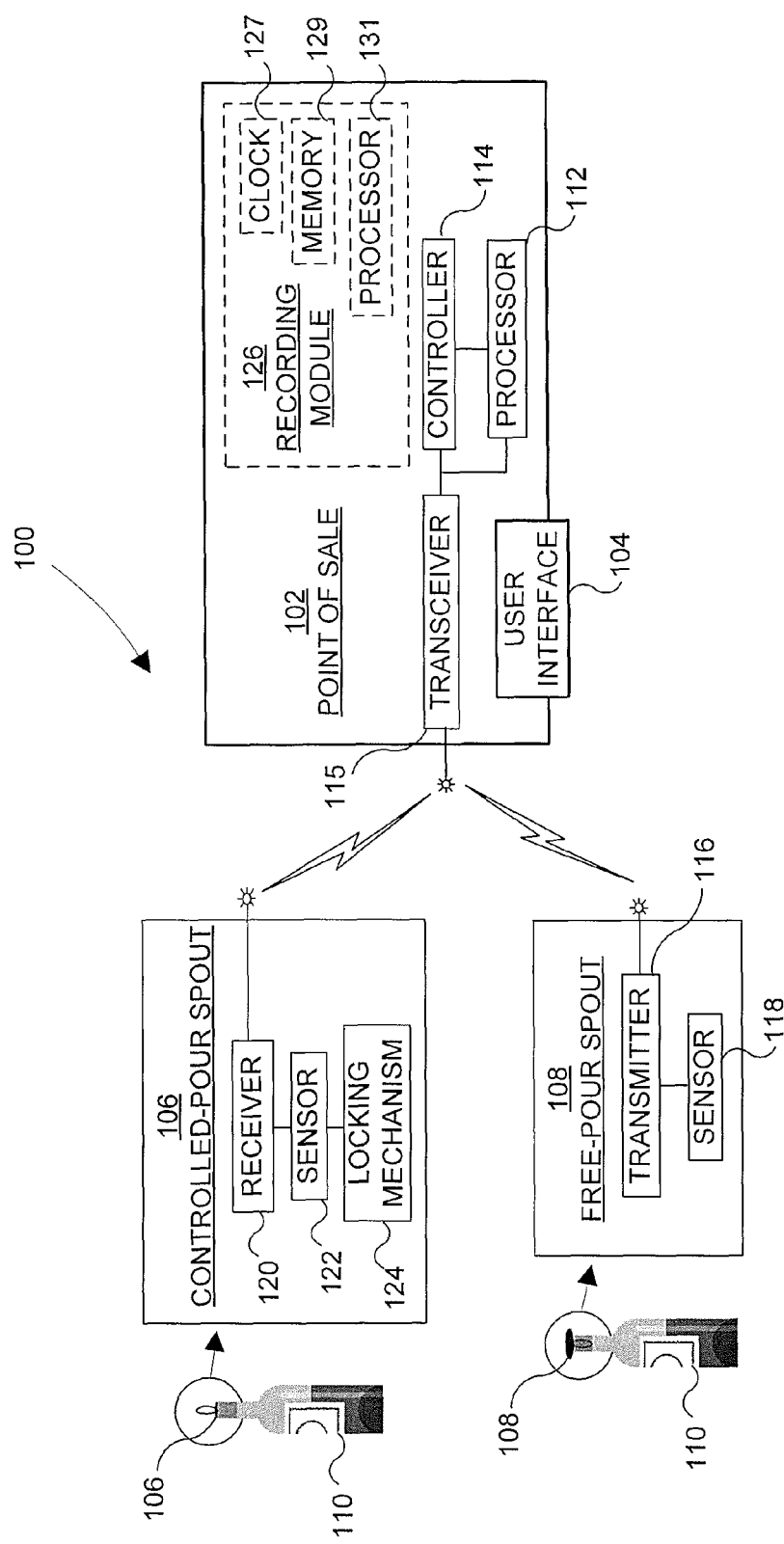
FIG. 2 is a functional block diagram that shows components of the free-pour and controlled-pour spouts within the example beverage dispensing system of FIG. 1.

The beverage dispensing system 100 shown in FIG. 2 includes a user interface 104 and both free-pour 106 and controlled-pour 108 spouts are wirelessly coupled to the point of sale 102. The free-pour spouts 106 are wireless in the examples shown in FIG. 2, although wired free-pour spouts 106 are an alternative. The controlled-pour spouts 108 shown in FIG. 2 are electromagnetic, ring-activated spouts, although other spouts having a controllable locking mechanism may be used. The point of sale 102 includes a transceiver 115 to facilitate wireless communication with the spouts 106, 108. The processor 112 of the point of sale 102 receives information from one or more of the spouts 106, 108 and the user interface 104, analyzes the data, and generates additional data based on the information it receives. For example, the free-pour spout 106 shown in FIG. 2 sends data to the point of sale 102 that includes the type of ingredient and the quantity of the ingredient that is being used to pour a beverage for a patron. The processor 112 calculates any desired output data that is based on this input data from the free-pour spout 106, including a price of the beverage based on the ingredient and the quantity of the ingredient that was measured by the free-pour spout 106.

The controller 114 in the point of sale 102 sends instructions and other data to one or more of the spouts 106, 108 and the user interface 104. The controller 114 may include a main microcontroller-based control board that manages the user interface 104, detects wireless spout signals for the free-pour spouts 106, interfaces with the control board that detects and controls the controlled-pour spouts 108, and stores and timestamps pours from either or both of the free-pour 106 or the controlled-pour 108 spouts with brand, amount, and type (cocktail, shot, or other sized pours). The controller 114 interfaces with the point of sale 102 or any other central computing unit by any suitable connection such as RS-232 ports (the system can be adapted to be used by other communication forms). The control board of the controller 114 may mimic a scanned keypad matrix or direct serial/USB/Ethernet or other communication scheme to effect communication between the user interface 104 and the point of sale 102. Any information relating to the user's beverage selection and the user interface 104 is stored either on the touch screen itself or in flash memory on the control board and is user programmable, if desired. Any of the control boards used for either the point of sale 102 or the controlled-pour spouts 108 can be a custom design and may have flash memory or other memory included.

Both the free-pour 106 and the controlled-pour 108 spouts are secured to containers that contain beverage ingredients 110, as shown in FIG. 2. The free-pour spouts 106 include a transmitter 116 and one or more sensors 118. A user pours the desired amount of the ingredient 110 from the container. The sensor(s) 118 in the free-pour spout 106 identify the ingredient 110 in the container and measure the quantity of the ingredient 110 that is poured from the containers. The transmitter 116 sends data that includes the identity of the ingredient 110 and the quantity that was poured to the point of sale 102. Other data may be included, as desired. The point of sale 102 calculates the price of the beverage based on the identity of the ingredient 110 and the quantity of the ingredient 110 that was poured after this information is received from the free-pour spout 106.

The controlled-pour 108 spouts shown in FIG. 2 include a receiver 120, one or more sensors 122, and a locking mechanism 124. The controlled-pour spout 108 receives data that includes a dispensing instruction generated by the point of sale 102. The dispensing instruction instructs the controlled-pour spout 108 to dispense an instructed amount of the ingredient 110 contained in the container to which the controlled-pour spout 108 is secured. The point of sale 102 calculates the price of the beverage based on the identity of the ingredient 110 and the quantity of the ingredient 110 that is to be poured. The calculation of the price of beverages poured from the controlled-pour 110 spouts may be calculated prior to the ingredients 110 being poured because the ingredient 110 and the quantity is known by the point of sale 102 prior to commencing pouring of the ingredient 110. However, the price of beverages poured with the controlled-pour spouts 108 can be calculated at any suitable time.

As discussed above, the point of sale 102 calculates the price of the beverage based on the ingredient(s) 110 and the quantit(ies) of the ingredients 110 that are poured to make the desired beverage. Some points of sale 102 automatically calculate the price upon completing the beverage's pour and may display the price for the user or store it in memory for later retrieval, such as when a patron wishes to reconcile his or her bill for the beverage(s). Alternative points of sale 102 request user input to calculate the price of the beverage. For example, the point of sale 102 may prompt the user to confirm that the beverage was poured correctly before a price is calculated. In another example, the point of sale 102 may prompt the user to confirm when the beverage's pour is complete at which point the price is then calculated to accommodate any add-ons or custom features of the beverage that may need to be factored into the final price.

The point of sale 102 shown in FIG. 2 optionally includes a clock 126. Some examples have a recording module 126 that includes a clock 127, a memory 129, and optionally a processor 131. These example beverage dispensing systems 100 are able to store time-stamped data in the memory 129 and optionally include a processor 131 that manipulates the data or otherwise analyzes it. Reports can be generated from the data stored in the memory 129 in this example recording module 126. The recording module 126 includes a clock 127 that may be a real-time clock that preserves current time for time-stamping purposes and information about beverages poured from either or both of the free-pour 106 and controlled-pour 108 spouts in local memory 129. The beverage dispensing system 100 may access this information stored in the local memory 129 of the recording module 126 in case of a power disruption to the point of sale 102, for example. An example clock 127 is a battery-lithium ion type CR 2032 clock. The clock 127 timestamps any suitable data including the times that a user accesses the beverage dispensing system 100, the types and ingredients 110 of beverages that were ordered for purposes of helping owners to stock inventory and staff an establishment adequately, and the monitoring of sales.

While any number of ingredients 110 may be used in the beverage dispensing system 100, most often many ingredients 110 are included so that several different beverage selections can be poured. Each ingredient 110 has a unique thickness and viscosity, which are predetermined and available to the processor 112, such as in a data store or other local or remote memory. The sensor 118 in the free-pour spout 106 calculates the quantity of the ingredient 110 that was dispensed based on this data. For example, the sensor 118 in the free-pour spout 106 may include a sensor that measures how long the container was inverted. The quantity of the poured ingredient 110 is calculated based on this time calculation and the known thickness and viscosity of the ingredient 110.

The controlled-pour spouts 108 operate somewhat differently. The point of sale 102 identifies the ingredients 110 and determines the quantity of the ingredients 110 that need to be dispensed for the beverage selection based on the known thickness and viscosity of the ingredients 110 in the beverage selection. The dispensing instruction includes precise information regarding the amount of the ingredient 110 to instruct the controlled-pour spout 108 to dispense from the container before the locking mechanism 124 locks the controlled-pour spout 108 and the ingredient 110 ceases to be dispensed.

Some configurations include a radio-frequency identification (RFID) tag or other identifying mechanism that identifies the ingredient 110 in the container when either the free-pour 106 or the controlled-pour 108 spouts are secured to the ingredient's 110 container. Identifying the ingredient 110 in the container also can be performed manually at the time the free-pour 106 or controlled-pour 108 spouts are secured to the ingredient's 110 container. In this alternative example, the user may be prompted on a user interface 104 to identify the ingredient 110 in the container to which a particular spout is secured. Any suitable means of identifying the ingredients 110 may be used.

Figure 3:
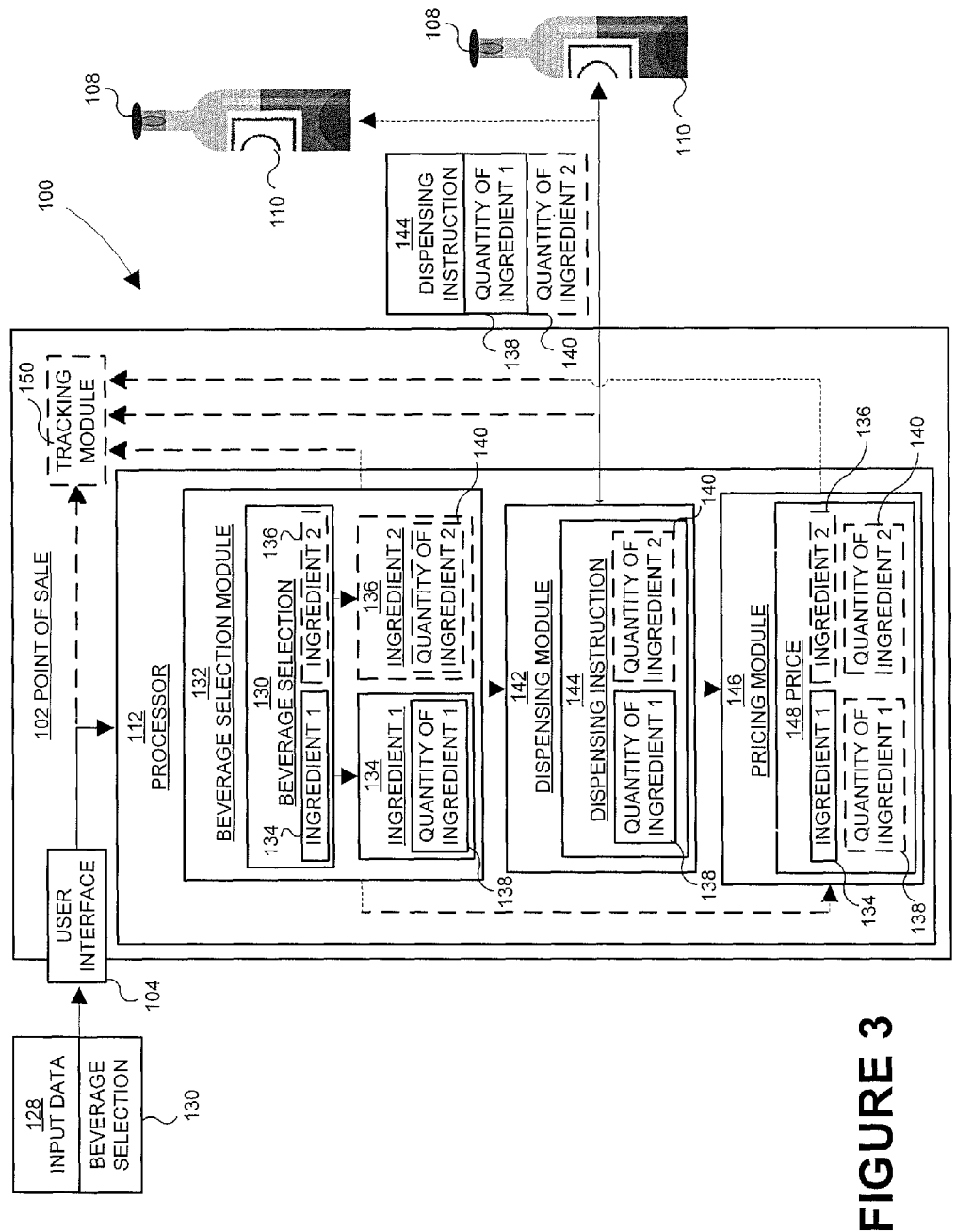
FIG. 3 is a functional block diagram that shows an example of multiple controlled-pour spouts within the beverage dispensing system of FIG. 1.
Figure 4:
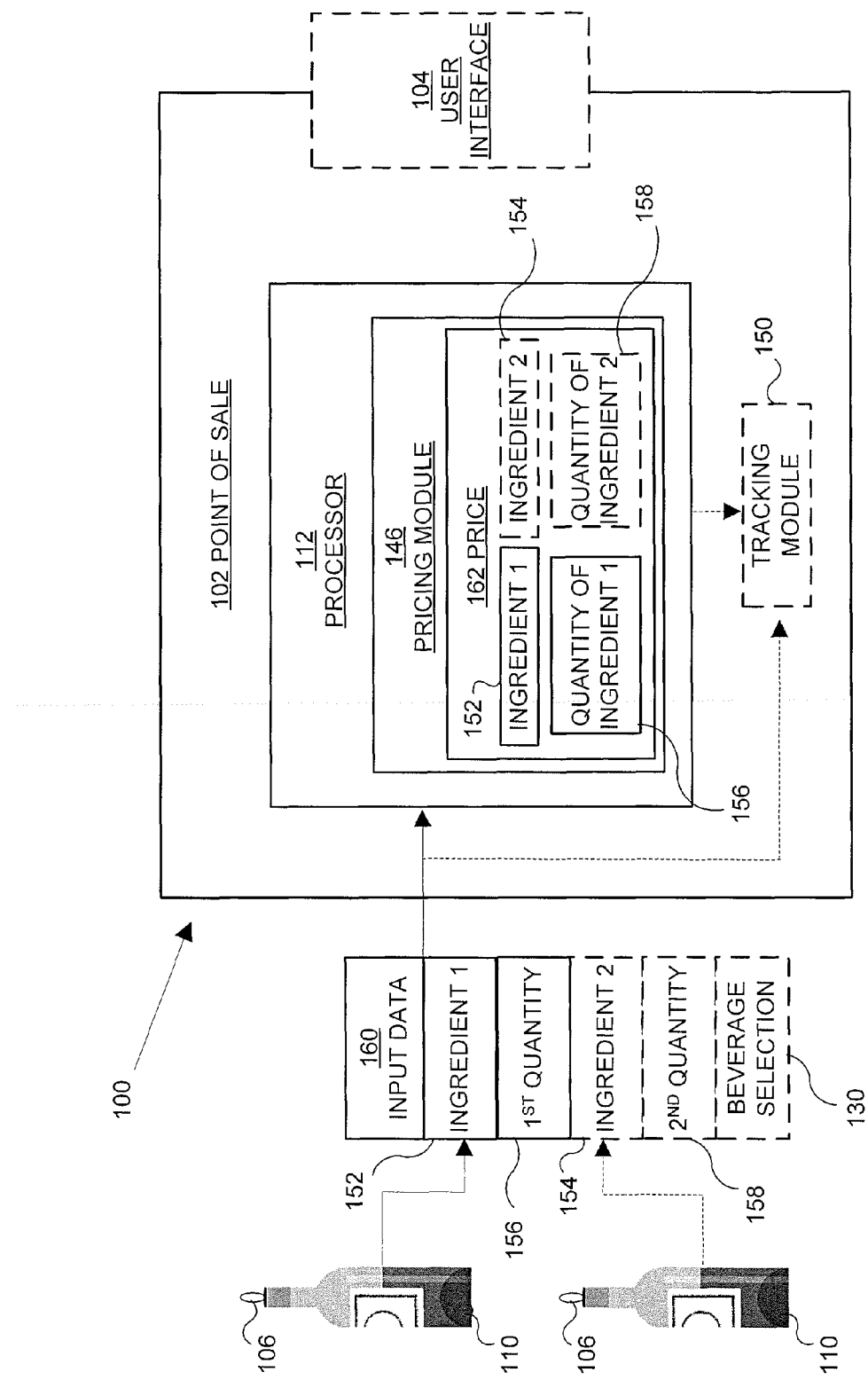
FIG. 4 is a functional block diagram that shows an example of multiple free-pour spouts within the beverage dispensing system of FIG. 1.

FIGS. 3 and 4 show a controlled-pour 108 and a free-pour spout 106, respectively, coupled to the point of sale 102 in a beverage dispensing system 100. The controlled-pour spout 108 example of FIG. 3 shows that a user interface 104 receives input data 128 that includes a beverage selection 130. Any other additional information also may be received by the user interface 104. The processor 112 in the point of sale 102 includes several modules that manipulate and/or analyze the data received at the user interface 104. A beverage selection module 132 receives the beverage selection 130, identifies the ingredients 134, 136 in the beverage selection 130, and identifies the quantity 138, 140 of each ingredient that should be included in the beverage selection 130. FIG. 3 shows that the selected beverage 130 includes two ingredients 134, 136 and thus two corresponding quantities 138, 140 of each of the ingredients 134, 136. The beverage selection 130 may include any number of ingredients.

The processor 112 in the point of sale 102 also includes a dispensing module 142 that generates a dispensing instruction 144. The dispensing instruction 144 includes the quantity 138 of the first ingredient 134 and the quantity of any other ingredients, such as the quantity 140 of the second ingredient 136 shown in FIG. 3. The dispensing instruction 144 is then sent to the respective controlled-pour spouts 108 of the containers for the ingredients 110 to pour the ingredients in the instructed quantities. FIG. 3 shows a dispensing instruction 144 received by controlled-pour spouts 108 regarding first 134 and second 136 ingredients.

The processor 112 in the point of sale 102 shown in FIG. 3 also includes a pricing module 146. The pricing module 146 receives information from any other module regarding the ingredients 134, 136 in the beverage selection 130 and the quantity 138, 140 of each ingredient 134, 136 that needs to be dispensed. The pricing module 146 calculates the price 148 of the beverage selection 130 based on this data, although it may receive other optional data on which it bases the price 148 of the beverage selection 130. In the example shown in FIG. 3, the pricing module 146 receives data from both the beverage selection module 132 and the dispensing module 142 regarding the ingredients 134, 136 and the quantity 138, 140 of each ingredient 134, 136 in the beverage selection 130.

The point of sale 102 includes a tracking module 150 that may be a part of or separate from the processor 112. The tracking module 150 receives information from any of the elements of the beverage dispensing system 100. For example, the tracking module 150 shown in FIG. 3 receives data from the user interface 104, the beverage selection module 132, the dispensing module 142, and the pricing module 146. The tracking module 150 tracks any desired data relating to the beverage dispensing system 100 including, but not limited to user behavior and orders, inventory, pricing of beverages for patron bills and monitoring sales, and the like.

The controlled-pour spouts 108 shown in FIG. 3 may include a ring-activated spout that is sealed until the beverage dispensing system 100 sends a dispensing instruction 144 to pour an ingredient from the container to which the controlled-pour spout 108 is secured. In some configurations, the controlled-pour spout 108 includes a fully sealed RFID tag that is read by the activator ring to identify the ingredient contained in the container to which the controlled-pour spout 108 is secured. In this example, a spring-loaded stopper seals or "locks" the controlled-pour spout 108 until it is opened electromagnetically by the activator ring based on a dispensing instruction 144.

The sensor 122 in the controlled-pour spout 108 may include a tip sensor that determines when the container to which the controlled-pour spout 108 is secured has been tipped over or otherwise inverted. A brand-specific calibration factor is used to determine how long the spout is held open to ensure the correct amount of the ingredient is poured from the controlled-pour spout 108. In some embodiments, the power for the controlled-pour spout 108 to perform these functions comes from the beverage dispensing system 100 so that the controlled-pour spout 108 itself does not contain a power source. The ring-activated electronics in the controlled-pour spout 108 are fully sealed against liquids and may be freely washed.

In some configurations of the ring-activated example of the controlled-pour spout 108, the ring is removable from the pouring spout. The identification of the ingredient in the container to which the controlled-pour spout 108 is secured is stored in an RFID tag of the pouring spout. When the pouring spout is inserted into the ring, the ingredient is automatically identified and the locking feature is enabled. The electromagnet of the ring moves a spring-mounted steel stopper to open the controlled-pour spout 108 and pour the ingredient when the dispensing instruction 144 is received. This configuration of the controlled-pour spout 108 where the ring and the pouring spout are separable facilitates sharing ingredients among multiple users. When a particular user wishes to dispense a beverage, the user only needs to attach a ring to the pouring spout and await the dispensing instruction 144 before use. In the event that the pouring spout of a beverage that is either not included in the beverage selection 130 or that has already been poured is inserted into ring, the user is alerted of the incorrect ingredient and prompted to select the correct ingredient instead.

The free-pour spout 106 configuration shown in FIG. 4 includes a point of sale 102 having a processor 112, an optional tracking module 150, and an optional user interface 104. For purposes of explanation, FIGS. 3 and 4 have been separated, showing the free-pour spout 106 separate from the controlled-pour spout 108. However, the free-pour spout 106 and the controlled-pour spout 108 may be combined into a single system sharing a common point of sale 102, processor 112, and user interface 104. Further, the tracking module 150 and pricing module 146 also may be common to both the free-pour 106 and the controlled-pour 108 spouts, although each of these modules will be programmed to operate differently with respect to the data relating to each of the free-pour 106 and the controlled-pour 108 spouts.

The free-pour spouts 106 shown in FIG. 4 are secured to two ingredients 152, 154, although more or less ingredients can be included in other examples. The sensors 118 in the free-pour spouts 118 identify the ingredient 152, 154 and measure the quantity 156, 158 of the ingredient 152, 154 that is dispensed from the container and may include any one or more of the following sensors: tilt switches, inclinometer, flowmeter, accelerometer, and the like. The input data 160 to the point of sale 102 includes the identity of the first 152 and the second 154 ingredients and their corresponding quantities 156, 158. An internal calibration factor or curve that is based on criteria such as viscosity of the ingredient, flow rate of the free-pour spout 106, and the amount of time that the ingredient was poured, among others, is used to calculate the quantity of the ingredient that was poured. This data is received by the processor 112, which calculates a price 162 of the beverage based on the ingredients 152, 154 poured and the corresponding quantities 156, 158. Some free-pour spouts 106 locally store this data if communication with the point of sale 102 is unavailable so that the data can be retrieved at a later time. As discussed above with respect to the controlled-pour spout 108 example, the point of sale 102 optionally includes a tracking module 150 that is either part of or remote from the processor 112 that tracks any data received by or generated by the point of sale 102.

The free-pour spouts 106 preserve the look and feel of traditional free pouring of ingredients 110. When the container is inverted, the ingredients 110 flow freely from the container. When the container is turned back upright, the free-pour spout 106 sends data in the form of an RF signal, in some examples, that includes the quantity 156, 158 of the poured ingredient 152, 154 back to the point of sale 102, as shown in FIG. 4.

The free-pour spouts 106 are wireless in some examples and may communicate wirelessly with the point of sale 102 and other elements of the beverage dispensing system 100, such as the user interface 104. In this case, each free-pour spout 106 is assigned to a specific beverage dispensing system 100 so that only the correct beverage dispensing system 100 receives the signal from the free-pour spout 106 and confusion does not occur between beverage dispensing systems 100 on what ingredients were poured and to whom the cost of the beverages should be assigned.

Since the free-pour spouts 106 allow the user to freely pour the desired amount of the ingredient 110, the spouts 106 and the point of sale 102 may assign a "size" to each pour. For example, a typical size for a single shot is approximately 2 fluid ounces. When a user pours approximately 2.2 fluid ounces, the point of sale 102 may round down to the single shot size. However, if the user pours a 3-4 ounce shot, the point of sale 102 may round up to the double shot size. Various sizes may be predetermined or may be set by a user. Half and quarter shots also may be available as options to measure the pours in some examples. In alternative examples, users may set their own pour sizes or may have the option to control whether the shot is assigned to a particular size before the pricing occurs. The user may be presented a menu with image options to select the size associated with a particular pour in some examples or the size may be automatically assigned in other examples.

Referring again to the beverage dispensing system 100 example that includes multiple free-pour spouts 106 and multiple controlled-pour spouts 108, many different types of drinks can be dispensed from the beverage dispensing system 100, including cocktails. Pouring cocktails usually includes several different ingredients, many or most of which are alcohol, liquor, or mixers. Pricing of the cocktails can be done by pouring from either the controlled-pour spouts 108 or the free-pour spouts 106. In either situation, the user may select a cocktail from a predefined menu that is presented on the user interface 104. The cocktail selection is organized in any suitable fashion, such as by the first letter of the name of each cocktail. Various menu screens may be presented to the user during the beverage selection process for the controlled-pour spouts 108 and the beverage identification process with the free-pour spouts 106.

With the controlled-pour spouts 108, when a cocktail is selected, the pricing module 146 determines the price 148 of the cocktail based on the ingredients and the quantities that are predetermined for the cocktail. Sometimes, users wish to customize the cocktail by adding additional ingredients, such as a "double" shot or a "floater" of liquor. Users pouring a cocktail from the controlled-pour spouts 108 have the option to add these features and the pricing module 146 recalculates the price 148 based on the custom additions. For example, a cocktail typically has a single shot of a liquor, such as whiskey, in it but the patron wishes for the cocktail to have two shots of whiskey in the cocktail. The user of the beverage dispensing system 100 orders the cocktail, then adds a second shot or any other quantity of the requested ingredient 110, in this case, a second shot of whiskey is added to the cocktail. Sometimes, the user wishes to view or audibly receive pre-pour instructions relating to the appropriate type of glass to use, the amount of ice to add, whether to include necessary or requested garnish or the like. The user may have the option to view this information prior to the beverage being poured or may skip this information if the user does not need to see it.

With the free-pour spouts 106, the cocktail is poured by the user, then the beverage dispensing system 100 identifies the poured cocktail by comparing the ingredients and quantities thereof that were poured against a predefined group of cocktails' recipes until a match is found. If the beverage dispensing system 100 does not recognize a cocktail that has been poured, the user may be presented with options on the user interface 104 of cocktails that are similar to the cocktail that was poured based on the ingredients and the quantity of the ingredients that were poured. When the beverage dispensing system 100 does not recognize a cocktail that was poured by the user, the user may be prompted to create a new beverage for inclusion in the predefined list of cocktails. The cocktails that are recognized are priced based on the price assigned to the cocktail and/or the ingredients poured, depending on the configuration of the beverage dispensing system 100. The poured cocktails that are not recognized by the beverage dispensing system 100 are priced based on the quantity and identity of the poured ingredients.

Security seals may be secured to both or either of the free-pour 106 and the controlled-pour 108 spouts. The security seals help protect against unauthorized removal of the spouts from the containers. A user may attempt to remove the free-pour or controlled-pour spouts so that ingredients can be poured undetected by the beverage dispensing system 100. The security seals may be applied by operators or owners of the beverage dispensing system 100 or anyone who wishes to prevent users from pouring ingredients undetected. The security seals are any suitable mechanism, electrical, mechanical, chemical, or some combination thereof, that indicates whether the free-pour or controlled-pour spout has been removed from the container in an unauthorized manner. Example security seals include heat shrink tubing or other materials and sticker type materials.

Various portions of the beverage dispensing systems described above may be positioned at different locations suitable to the manner in which the systems will be used. For example, computing elements, such as the processor and an optional memory, may be positioned remote from the user interface and/or the sensors that are secured to one or more ingredients of the poured beverages. In yet other examples, some ingredients of the dispensed beverages are located in a remote location, such as a back room. The ingredients include any liquor, mixer, juice, soda, or other ingredients for the dispensed beverage and may be located in the back room or any other remote location of a bar, restaurant, or other establishment serving beverages. The computing elements and the beverage ingredients may be located in the same or different locations from each other and from the beverage dispensing station and/or the user interface.

By locating the ingredient containers in the back room, additional space at the beverage dispensing station is available that would otherwise be taken by the ingredient containers and a cleaner beverage dispensing station is provided because spills, changing ingredient containers, and other such tasks occur in the back room rather than at the beverage dispensing station. These and other benefits provide for a cleaner, more efficient process of pouring beverages at the beverage dispensing station. Such a system is a "remote" style system as compared to a self-contained system in which all of the elements of the beverage dispensing system are physically located in the same general location and at or near the beverage dispensing station, such as within a housing or other container at the user interface or near the location where the beverages are poured or dispensed.

Figure 5:
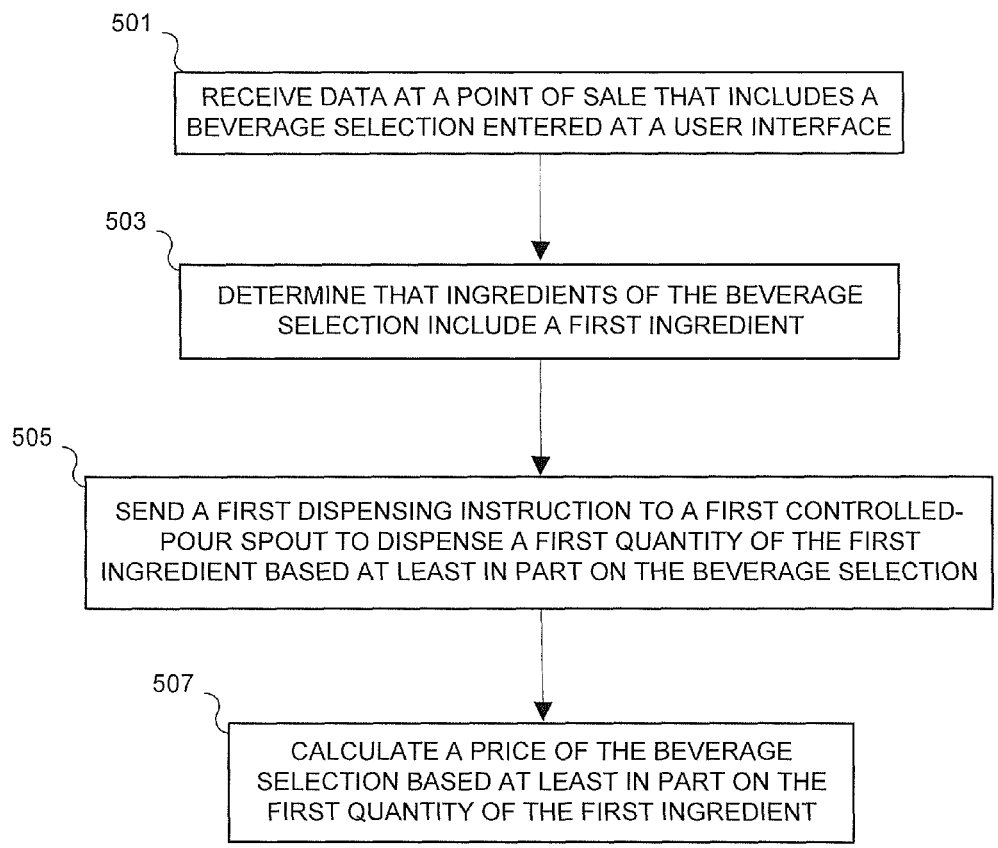
FIG. 5 shows a method of dispensing a beverage with a controlled-pour spout.
Figure 6:
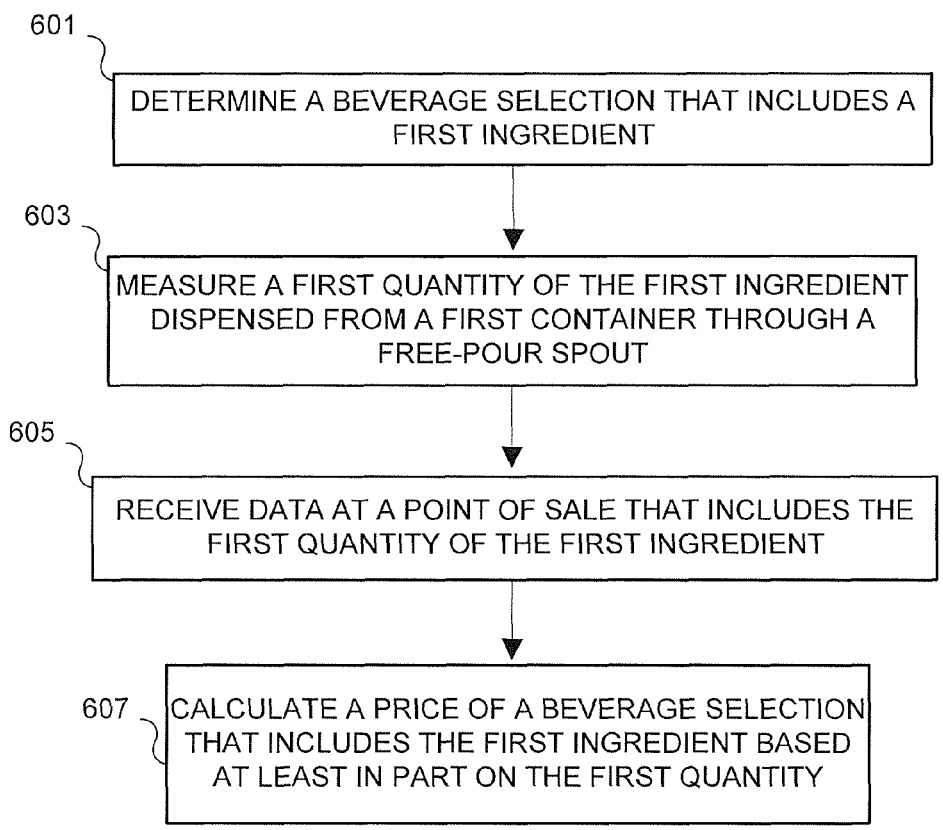
FIG. 6 shows a method of dispensing a beverage with a free-pour spout.

Turning now to FIGS. 5 and 6, methods of the above described systems are shown. FIG. 5 shows a method of dispensing a beverage with a controlled-pour spout, as described above in which data is received at a point of sale that includes a beverage selection entered at a user interface 501; ingredients of the beverage selection are determined to include a first ingredient 503; a first dispensing instruction is sent to a first controlled-pour spout to dispense a first quantity of the first ingredient based at least in part on the beverage selection 505; and a price of the beverage selection is calculated based at least in part on the first quantity of the first ingredient 507.

FIG. 6 shows a method of dispensing a beverage with a free-pour spout, as described above in which a beverage selection that includes a first ingredient is determined 601; a first quantity of the first ingredient dispensed from a first container through a free-pour spout is measured 603; data is received at a point of sale that includes the first quantity of the first ingredient 605; and a price of the beverage selection is calculated based at least in part on the first quantity 607. The methods shown in FIGS. 5 and 6 are shown separated for purposes of explanation. However, these methods may be combined into a single method for dispensing beverages from both the controlled-pour and the free-pour spouts of FIGS. 5 and 6, respectively.

Many of the features of the beverage dispensing systems described above include computing elements, such as servers, processors, and the like. A person skilled in the art will appreciate that software, firmware, or some combination thereof may be used to perform one or more of the functions of the beverage dispensing system. For example, software and/or firmware may be used to present menus to the user at the user interface. Further, software and/or firmware, may be included in a processor that performs the functions of one or more of the beverage selection module, the dispensing module, the pricing module, and/or the tracking module described above.

The beverage dispensing system makes dispensing beverages, especially complex cocktails, easy. It reduces the need for skilled bartenders and reduces the amount of mistakes made by bartenders or other pourers. Further, it reduces the amount of time that is required to dispense a complex beverage, like a cocktail and helps prevent waste and theft of inventory. Those skilled in the art will appreciate that the disclosed beverage dispensing system provides additional benefits that are not described in this disclosure.

Thus, although there has been described to this point particular embodiments for a method and apparatus for beverage dispensing systems, it is not intended that such specific references be considered as limitations upon the scope of this invention except in-so-far as set forth in the following claims.

What is claimed is:

1. A beverage dispensing system, comprising:
a first dispensing element secured to a first beverage container containing a first ingredient;
a free-pour spout having a first sensor secured to and in physical contact with the first dispensing element and configured to measure a length of time the first beverage container is inverted and dispensing the first ingredient; and
a processor electrically coupled to the first sensor, the processor configured to:

receive data that includes a beverage selection,
determine at least one ingredient in the beverage selection,
calculate a quantity of the at least one ingredient in the beverage selection based on the measured length of time the first beverage container is inverted and dispensing the first ingredient,
generate a dispensing instruction that includes data instructing the first sensor to dispense a first quantity of the first ingredient according to the dispensing instruction,
send data including the dispensing instruction to the first sensor, wherein the first sensor and the first dispensing element are configured to dispense the first ingredient according to the dispensing instruction, and
calculate a price of the beverage selection based at least in part on the first quantity.

2. The beverage dispensing system of claim 1, wherein the first sensor is integral with the first dispensing element.

3. The beverage dispensing system of claim 1, wherein the processor is wirelessly connected to the first sensor.

4. The beverage dispensing system of claim 1, wherein the first sensor includes at least one of an inclinometer and a flow meter.

5. The beverage dispensing system of claim 1, wherein the beverage selection includes a first ingredient and a second ingredient.

6. The beverage dispensing system of claim 5, further comprising:
a second dispensing element secured to a second beverage container containing a second ingredient;
a second sensor secured to the second dispensing element;
wherein the processor is electrically coupled to the second sensor and is further configured to:
determine that the beverage selection includes the first ingredient and the second ingredient,
generate a second dispensing instruction that includes data instructing the second sensor to dispense the second quantity of the second ingredient according to the second dispensing instruction, and
send data including the second dispensing instruction the second sensor.

7. The beverage dispensing system of claim 5, wherein the price of the beverage selection is based at least in part on the first ingredient and the second ingredient.

8. The beverage dispensing system of claim 1, wherein the price of the beverage selection is calculated after the data including the dispensing instruction is sent to the first sensor.

9. The beverage dispensing system of claim 1, wherein the price is calculated without user action.

10. The beverage dispensing system of claim 1, wherein the processor is further configured to calculate the quantity of the at least one ingredient in the beverage selection based on the measured length of time the first beverage container is inverted and dispensing the first ingredient and at least one of a viscosity of the first ingredient and a flow rate of the first dispensing element.

11. The beverage dispensing system of claim 1, wherein the processor is further configured to generate pre-pour instructions that include at least one of a glass type, a quantity of ice and a garnish, the pre-pour instruction based on at least one of the beverage selection, the calculated quantity of the at least one ingredient, and the generated dispensing instruction, and the beverage dispensing system further comprising a user interface electrically coupled to the processor, the user interface including a touchscreen that is configured to receive the data that includes the beverage selection and is also configured to display the generated dispensing instruction and a prompt providing an option to display the generated pre-pour instructions.

12. A beverage dispensing system, comprising:
a first dispensing element secured to a first beverage container containing a first ingredient;
a free-pour spout having a first sensor secured to and in physical contact with the first dispensing element and configured to identify the first ingredient and measure the quantity of the first ingredient that is dispensed from the free-pour spout; and
a processor electrically coupled to the first sensor, the processor configured to:
receive data that includes a beverage selection,
determine at least one ingredient in the beverage selection,
calculate a quantity of the at least one ingredient in the beverage selection based on the measured quantity of the first identified ingredient,
generate a dispensing instruction that includes data instructing the first sensor to dispense a first quantity of the first ingredient according to the dispensing instruction,
generate pre-pour instructions that include at least one of a glass type, a quantity of ice and a garnish, the pre-pour instructions based on at least one of the beverage selection, the calculated quantity of the at least one ingredient, and the generated dispensing instruction,
send data including the dispensing instruction to the first sensor, wherein the first sensor and the first dispensing element are configured to dispense the first ingredient according to the dispensing instruction, and
calculate a price of the beverage selection based at least in part on the first quantity;
a user interface electrically coupled to the processor, the user interface including a touchscreen that is configured to receive the data that includes the beverage selection and is also configured to display the generated dispensing instruction and a prompt providing an option to display the generated pre-pour instructions.

13. The beverage dispensing system of claim 12, wherein the pre-pour instructions include selecting a glass type from multiple glass types.

14. The beverage dispensing system of claim 12, wherein the pre-pour instructions include selecting the quantity of ice.

15. The beverage dispensing system of claim 12, wherein the pre-pour instructions include selecting a necessary or requested garnish.

16. The beverage dispensing system of claim 12, wherein the user interface is further configured to bypass the display of the pre-pour instructions when a user selects the prompt to bypass the generated pre-pour instructions.

17. The beverage dispensing system of claim 12, wherein the user interface is further configured to display the pre-pour instructions when a user selects the prompt to display the pre-pour instructions.

18. The beverage dispensing system of claim 12, further comprising a point of sale system electrically coupled to the processor of the beverage dispensing system, the point of sale system configured to receive a unique user identifier and allow a user to a select beverage to be dispensed.

19. The point of sale system of claim 18, further configured to record the dispensed beverage, the unique user identifier and the calculated cost of the beverage.

* * * * *